(12) United States Patent
Spangler et al.

(10) Patent No.: US 10,041,374 B2
(45) Date of Patent: Aug. 7, 2018

(54) GAS TURBINE ENGINE COMPONENT WITH PLATFORM COOLING CIRCUIT

(71) Applicant: UNITED TECHNOLOGIES CORPORATION, Hartford, CT (US)

(72) Inventors: Brandon W. Spangler, Vernon, CT (US); Ky H. Vu, East Hartford, CT (US); Gina Cavallo, Watertown, CT (US)

(73) Assignee: UNITED TECHNOLOGIES CORPORATION, Farmington, CT (US)

(\*) Notice: Subject to any disclaimer, the term of this patent is extended or adjusted under 35 U.S.C. 154(b) by 413 days.

(21) Appl. No.: 14/665,182

(22) Filed: Mar. 23, 2015

(65) Prior Publication Data

US 2015/0285097 A1 Oct. 8, 2015

Related U.S. Application Data

(60) Provisional application No. 61/975,191, filed on Apr. 4, 2014.

(51) Int. Cl.
*F01D 25/12* (2006.01)
*F01D 25/14* (2006.01)
(Continued)

(52) U.S. Cl.
CPC ............. *F01D 25/12* (2013.01); *F01D 5/081* (2013.01); *F01D 5/147* (2013.01); *F01D 5/18* (2013.01); *F01D 5/181* (2013.01); *F01D 5/186* (2013.01); *F01D 9/023* (2013.01); *F01D 25/14* (2013.01); *F01D 25/24* (2013.01); *F05D 2220/32* (2013.01); *F05D 2230/30* (2013.01); *F05D 2260/202* (2013.01); *Y02T 50/676* (2013.01)

(58) Field of Classification Search
CPC .......... F01D 25/12; F01D 5/081; F01D 5/147; F01D 5/18; F01D 5/181; F01D 5/186; F01D 9/023; F01D 25/14; F01D 25/24
See application file for complete search history.

(56) References Cited

U.S. PATENT DOCUMENTS 5,394,932 A \* 3/1995 Carozza .................... B22C 1/00 164/137
5,413,458 A 5/1995 Calderbank
(Continued)

FOREIGN PATENT DOCUMENTS

DE 102011054876 A1 5/2012
EP 1621727 A1 2/2006
(Continued)

OTHER PUBLICATIONS

Extended European Search Report for Application No. EP 15 16 2285 dated Oct. 21, 2015.

*Primary Examiner* — Aaron R Eastman
(74) *Attorney, Agent, or Firm* — Carlson, Gaskey & Olds, P.C.

(57) ABSTRACT

A component according to an exemplary aspect of the present disclosure includes, among other things, a platform and a feed cavity that feeds a cooling fluid inside of the platform. The feed cavity includes a leg portion and a main body portion that extends from the leg portion inside of the platform. A cooling cavity is inside the platform and in fluid communication with the feed cavity.

12 Claims, 5 Drawing Sheets

(51) Int. Cl.
*F01D 25/24* (2006.01)
*F01D 5/18* (2006.01)
*F01D 9/02* (2006.01)
*F01D 5/08* (2006.01)
*F01D 5/14* (2006.01)

(56) References Cited

U.S. PATENT DOCUMENTS

| | | | |
|---|---|---|---|
| 6,186,217 B1 * | 2/2001 | Sikkenga | B22C 7/026 164/137 |
| 6,340,047 B1 * | 1/2002 | Frey | B22C 21/14 164/122.1 |
| 7,625,172 B2 | 12/2009 | Walz et al. | |
| 8,353,669 B2 | 1/2013 | Chon et al. | |
| 8,356,978 B2 | 1/2013 | Beattie et al. | |
| 8,511,995 B1 | 8/2013 | Liang | |
| 2005/0258577 A1 * | 11/2005 | Holowczak | B28B 7/0014 264/600 |
| 2006/0021730 A1 * | 2/2006 | Marcin, Jr. | B22C 9/04 164/122.1 |
| 2006/0024151 A1 * | 2/2006 | Keith | F01D 5/081 415/97 |
| 2006/0024163 A1 * | 2/2006 | Keith | F01D 5/081 416/97 R |
| 2007/0020100 A1 * | 1/2007 | Beeck | F01D 5/147 416/193 A |
| 2007/0147997 A1 * | 6/2007 | Cunha | B22C 9/10 416/97 R |
| 2011/0123310 A1 * | 5/2011 | Beattie | F01D 5/18 415/115 |
| 2011/0204205 A1 * | 8/2011 | Kamel | B22C 9/103 249/184 |
| 2011/0236206 A1 * | 9/2011 | Seely | F01D 5/082 416/1 |
| 2012/0107134 A1 * | 5/2012 | Harris, Jr. | F01D 5/081 416/97 R |
| 2012/0171046 A1 * | 7/2012 | Boyer | F01D 5/081 416/97 R |
| 2012/0328451 A1 | 12/2012 | Lomas et al. | |
| 2014/0003961 A1 | 1/2014 | Willey et al. | |
| 2014/0037461 A1 | 2/2014 | Lee | |

FOREIGN PATENT DOCUMENTS

| | | |
|---|---|---|
| EP | 2372086 A2 | 10/2011 |
| EP | 2489838 A2 | 8/2012 |

* cited by examiner

GAS TURBINE ENGINE COMPONENT WITH PLATFORM COOLING CIRCUIT

CROSS REFERENCE TO RELATED APPLICATION

This application claims priority to U.S. Provisional Application No. 61/975,191, which was filed on Apr. 4, 2014.

STATEMENT REGARDING FEDERALLY SPONSORED RESEARCH OR DEVELOPMENT

This invention was made with government support under Contract No. FA8650-09-D-2923-0021 awarded by the United States Air Force. The Government therefore has certain rights in this invention.

BACKGROUND

This disclosure relates to a gas turbine engine, and more particularly to a gas turbine engine component that employs a platform cooling circuit.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Because they are commonly exposed to hot combustion gases, many gas turbine engine components employ internal cooling circuits that channel a dedicated cooling fluid for cooling the component. Thermal energy is transferred from the component to the cooling fluid to cool the component. It can be difficult to manufacture cooling circuits having relatively complex geometries and intricate features.

SUMMARY

A component according to an exemplary aspect of the present disclosure includes, among other things, a platform and a feed cavity that feeds a cooling fluid inside of the platform. The feed cavity includes a leg portion and a main body portion that extends from the leg portion inside of the platform. A cooling cavity is inside the platform and in fluid communication with the feed cavity.

In a further non-limiting embodiment of the foregoing component, the component is one of a vane, a blade, a blade outer air seal (BOAS), a panel, and a liner.

In a further non-limiting embodiment of either of the foregoing components, the leg portion of the feed cavity extends through a rail that protrudes from a non-gas path surface of the platform.

In a further non-limiting embodiment of any of the foregoing components, the leg portion of the feed cavity extends through a non-gas path surface of the platform.

In a further non-limiting embodiment of any of the foregoing components, the cooling cavity extends in parallel with the main body portion of the feed cavity.

In a further non-limiting embodiment of any of the foregoing components, at least one inlet passage fluidly connects the cooling cavity to the feed cavity.

In a further non-limiting embodiment of any of the foregoing components, a plurality of inlet passages extend between the cooling cavity and the feed cavity.

In a further non-limiting embodiment of any of the foregoing components, a wall that surrounds the main body portion of the feed cavity includes a plurality of heat transfer augmentation devices.

In a further non-limiting embodiment of any of the foregoing components, the plurality of heat transfer augmentation devices include trip strips that protrude inwardly from a surface of the wall.

In a further non-limiting embodiment of any of the foregoing components, a plurality of film cooling holes extend through a surface of the platform and into the feed cavity.

A gas turbine engine component according to another exemplary aspect of the present disclosure includes, among other things, a platform and a cooling circuit formed inside the platform. The cooling circuit includes a feed cavity, a cooling cavity in fluid communication with the feed cavity, and at least one inlet passage that connects the cooling cavity to the feed cavity.

In a further non-limiting embodiment of the foregoing gas turbine engine component, the feed cavity includes a leg portion and a main body portion that extends transverse to the leg portion inside of the platform.

In a further non-limiting embodiment of either of the foregoing gas turbine engine components, the leg portion extends through a rail of the platform.

In a further non-limiting embodiment of any of the foregoing gas turbine engine components, the leg portion extends through a non-gas path surface of the platform.

In a further non-limiting embodiment of any of the foregoing gas turbine engine components, a plurality of film cooling holes extend from the feed cavity to a gas path surface of the platform.

A casting system according to another exemplary aspect of the present disclosure includes, among other things, a core assembly configured to form a platform cooling circuit, the core assembly including a feed core that includes a leg portion and a main body portion that extends from the leg portion. A shell surrounds the core assembly. The leg portion extends into the shell and the main body portion is spaced from the shell.

In a further non-limiting embodiment of the foregoing casting system, the core assembly includes another core that is separate from the feed core.

In a further non-limiting embodiment of either of the foregoing casting systems, an inlet plugs into the feed core and an outlet extends into the shell.

In a further non-limiting embodiment of any of the foregoing casting systems, the inlet is received within a recess of the main body portion of the feed core.

In a further non-limiting embodiment of any of the foregoing casting systems, the feed core is radially adjustable by moving the feed core relative to the shell.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a gas turbine engine component that includes a platform cooling circuit. The cooling circuit is formed inside the platform and may include a feed cavity and a cooling cavity in fluid communication with the feed cavity. At least one inlet passage connects the cooling cavity to the feed cavity. Alternatively, the feed cavity may be extended radially further into the platform such that the cooling cavity may be eliminated altogether. These and other features are discussed in greater detail herein.

Figure 1:
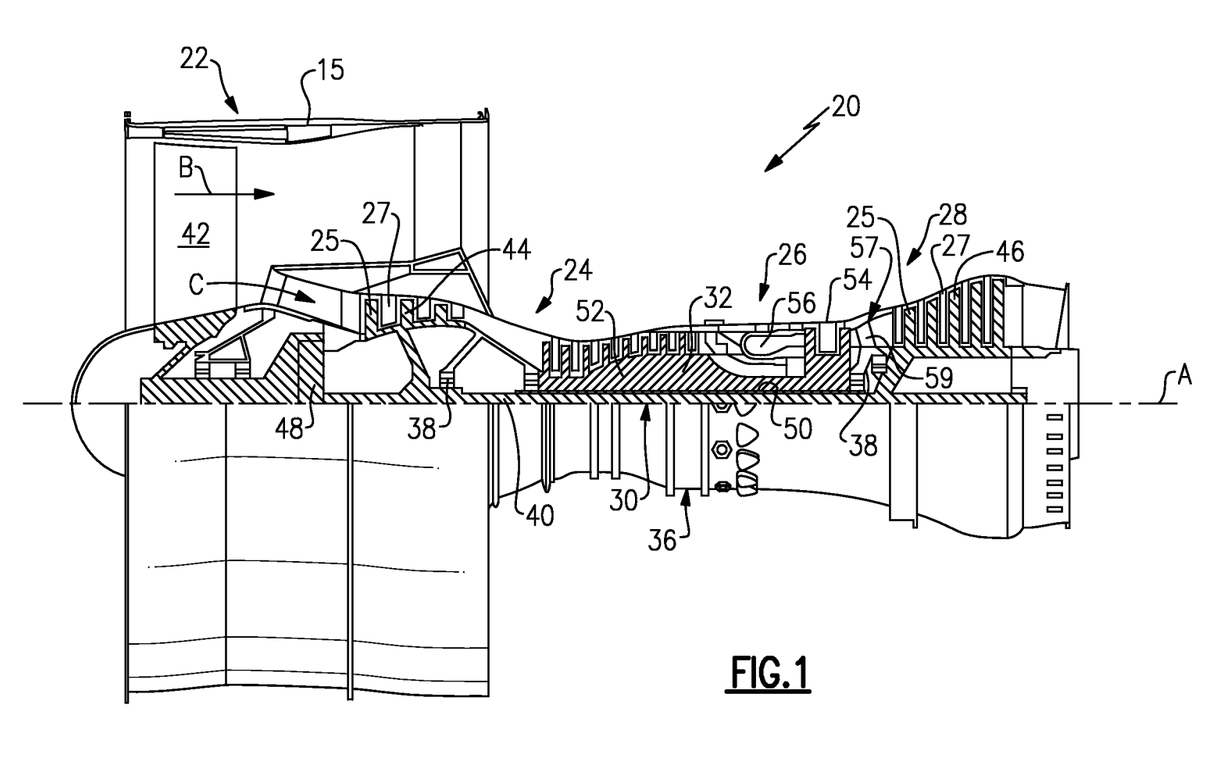
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans and turbo shafts.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1,150 ft/second (350.5 meters/second).

Each of the compressor section 24 and the turbine section 28 may include alternating rows of rotor assemblies and vane assemblies (shown schematically). For example, the rotor assemblies can carry a plurality of rotating blades 25, while each vane assembly can carry a plurality of vanes 27 that extend into the core flow path C. The blades 25 may either create or extract energy in the form of pressure from the core airflow as it is communicated along the core flow path C. The vanes 27 direct the core airflow to the blades 25 to either add or extract energy.

Figure 2:
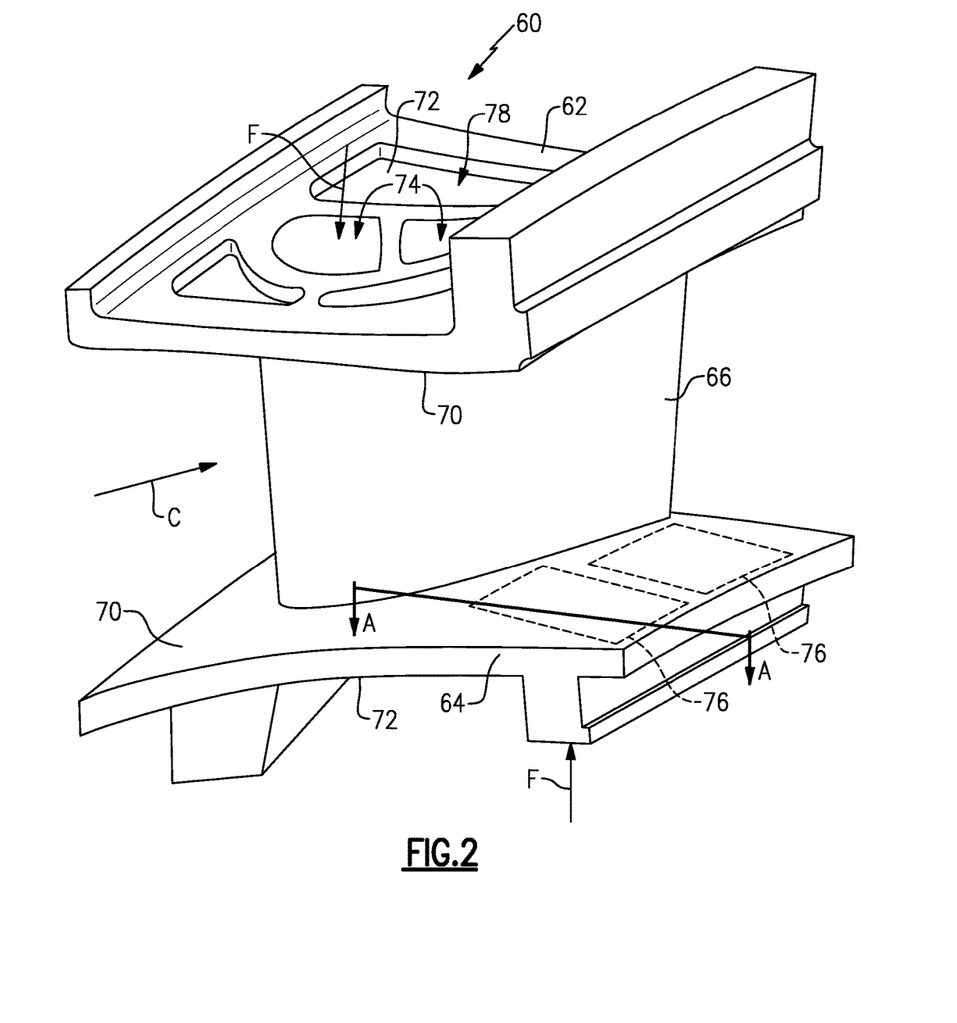
FIG. 2 illustrates a gas turbine engine component.

FIG. 2 illustrates a component 60 that can be incorporated into a gas turbine engine, such as the gas turbine engine 20 of FIG. 1. In this non-limiting embodiment, the component 60 is represented as a turbine vane. However, the teachings of this disclosure are not limited to turbine vanes and could extend to other components of a gas turbine engine, including but not limited to, other vanes, blades, blade outer air seals (BOAS), combustor panels, liners or other components.

In one embodiment, the component 60 includes an outer platform 62, an inner platform 64, and an airfoil 66 that extends between the outer platform 62 and the inner platform 64. The outer platform 62 connects the component 60 to an engine casing (not shown) and the inner platform 64 affixes a radially inward portion of the component 60 to securely position the component 60 within the core flow path C.

The outer platform 62 and the inner platform 64 may both include gas path surfaces 70 and non-gas path surfaces 72. The gas path surfaces 70 establish the radial flow boundaries of the core flow path C, whereas the non-gas path surfaces 72 are remote from the core flow path C.

The component 60 can include one or more internal cooling cavities 74 disposed inside the airfoil 66 of the component 60. In addition, one or more platform cooling cavities 76 (shown schematically) may be formed inside the inner platform 64 and/or the outer platform 62. The internal cooling cavities 74 and the platform cooling cavities 76 together define a cooling circuit 78 of the component 60. Cooling fluid F, such as bleed airflow, may be circulated through the cooling circuit 78 to cool the component 60.

The illustrated cooling circuit 78 represents but one non-limiting example of many potential cooling circuits designs. In other words, the gas turbine engine component 60 could be manufactured to include various alternatively shaped and sized cooling passages as part of an internal circuitry within the scope of this disclosure.

Figure 3:
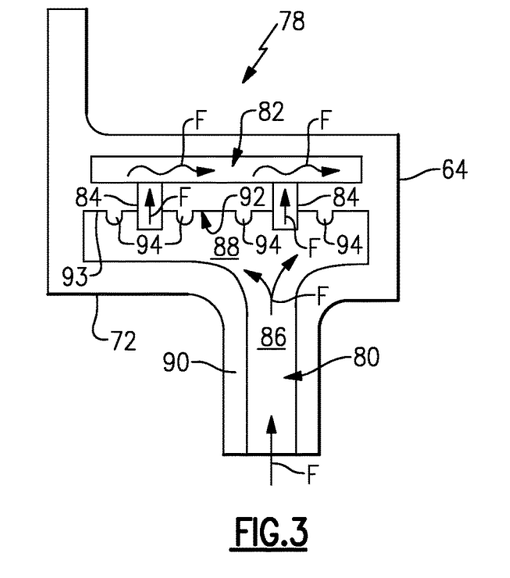
FIG. 3 is a cross-sectional view through Section A-A of FIG. 2 and illustrates a platform cooling circuit.

FIG. 3 illustrates a portion of the cooling circuit 78 described above with respect to FIG. 2. In this embodiment, the illustrated portions of the cooling circuit 78 are formed inside a platform 64 (which could be representative of any type of platform or body found on any type of component). The cooling circuit 78 may include a feed cavity 80 and a cooling cavity 82 in fluid communication with the feed cavity 80. One or more inlet passages 84 connect between the cooling cavity 82 and the feed cavity 80. Although two inlet passages 84 are shown in FIG. 3, the cooling circuit 78 could include a greater or fewer number of inlet passages within the scope of this disclosure.

In one embodiment, the feed cavity 80 includes a leg portion 86 and a main body portion 88. The main body portion 88 extends transversely from the leg portion 86 inside of the platform 64. The leg portion 86 generally extends radially inside the platform 64, whereas the main body portion 88 generally extends axially and circumferentially inside the platform 64 (although it will also have a slight radial dimension).

In one non-limiting embodiment, the leg portion 86 of the feed cavity 80 extends through a rail 90 of the platform 64. The rail 90 may extend inwardly from the non-gas path surface 72 of the platform 64. The leg portion 86 could alternatively extend through any portion of the non-gas path surface 72 of the platform 64.

A wall 92 may establish an outer perimeter of the main body portion 88 of the feed cavity 80. A plurality of heat transfer augmentation devices 94 may be formed on the wall 92. The heat transfer augmentation devices 94 may extend inwardly from a surface 93 of the wall 92, in one embodiment. The heat transfer augmentation devices 94 may include trip strips or any other augmentation device or combination of augmentation devices for increasing heat transfer between the platform 64 and a cooling fluid F.

In use, the feed cavity 80 may feed the cooling fluid F inside the platform 64. For example, the cooling fluid F may enter the platform 64 through the leg portion 86 and then radially communicated into the main body portion 88 of the feed cavity 80. The cooling fluid F may next circulate around the heat transfer augmentation devices 94 within the main body portion 88 prior to entering the inlet passages 84. Finally, the cooling fluid F passes from the inlet passages 84 into the cooling cavity 82 to convectively cool the platform 64.

Figure 4:
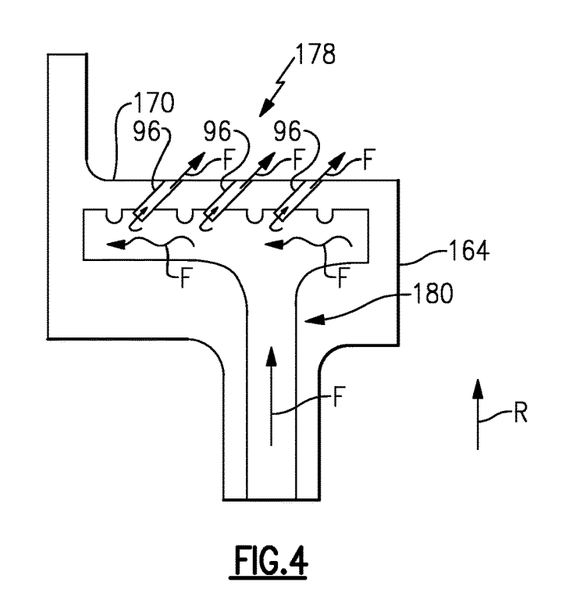
FIG. 4 illustrates a platform cooling circuit according to a second embodiment of this disclosure.

FIG. 4 illustrates another cooling circuit 178 that may be incorporated into a platform 164. In this disclosure, like reference numbers designate like elements where appropriate and reference numerals with the addition of 100 or multiples thereof designate modified elements that are understood to incorporate the same features and benefits of the corresponding original elements.

In this embodiment, the cooling cavity 82 of FIG. 3 has been eliminated by extending a feed cavity 180 radially further into the platform 164. The radial direction is designated by an arrow labeled "R" in FIG. 4. Extending the feed cavity 180 until it terminates at a location that is closer to a gas path surface 170 of the platform 164 may reduce the number of internal cavities or passages that are required inside the platform 164 to achieve adequate cooling.

The cooling circuit 178 may additionally include one or more film cooling holes 96 that are formed through the gas path surface 170 of the platform 164. In one non-limiting embodiment, the film cooling holes 96 are drilled through the gas path surface 170 and open into the feed cavity 180. A cooling fluid F that is circulated through the feed cavity 180 may be expelled through the film cooling holes 96 to provide a layer of film that protects the platform 164 against the hot combustion gases communicated along the core flow path C (see FIGS. 1-2).

Figure 5:
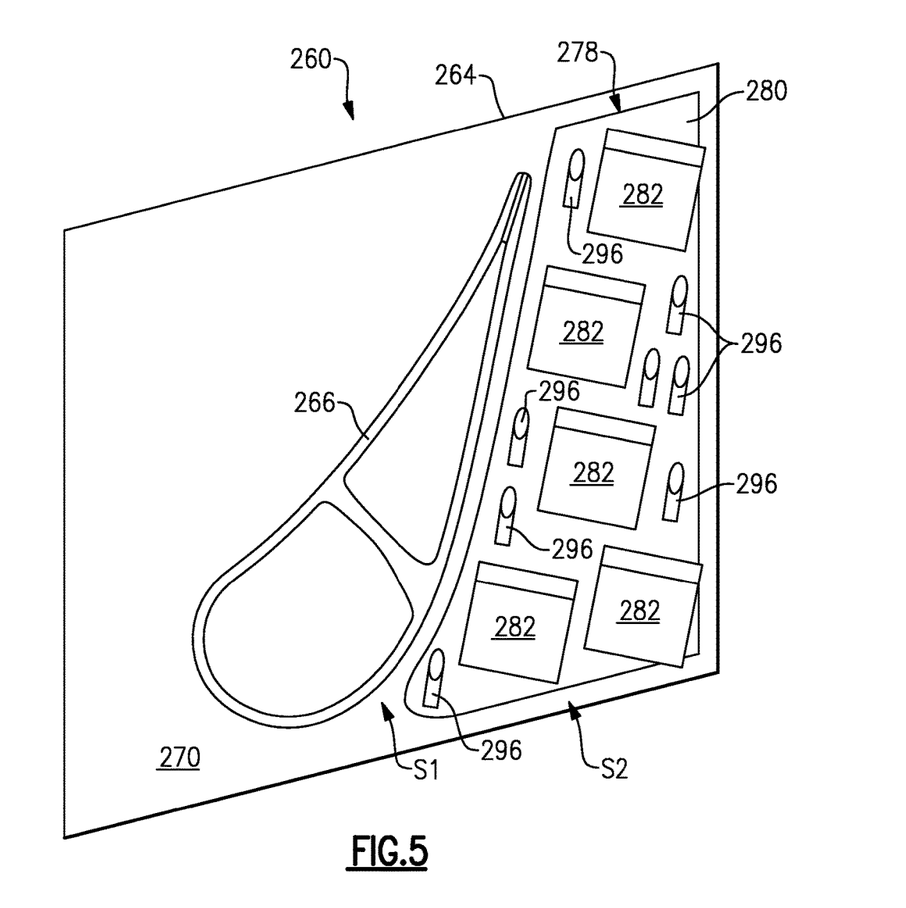
FIG. 5 illustrates a platform cooling circuit according to yet another embodiment of this disclosure.

FIG. 5 illustrates yet another exemplary cooling circuit 278. In this embodiment, the cooling circuit 278 includes a feed cavity 280 and a plurality of cooling cavities 282 that are fluidly connected to the feed cavity 280. In one embodiment, the cooling cavities 282 are mini-cavities. The feed cavity 280 and the plurality of cooling cavities 282 are formed inside a platform 264 and may be positioned on a suction side S1 of an airfoil 266 of the component 260. The feed cavity 280 may span across a majority of a suction side S2 of the platform 264.

The cooling circuit 278 may additionally include a plurality of film cooling holes 296. The film cooling holes 296 may be formed through a gas path surface 270 of the platform 264 and extend, or feed into, the feed cavity 280.

Figure 6:
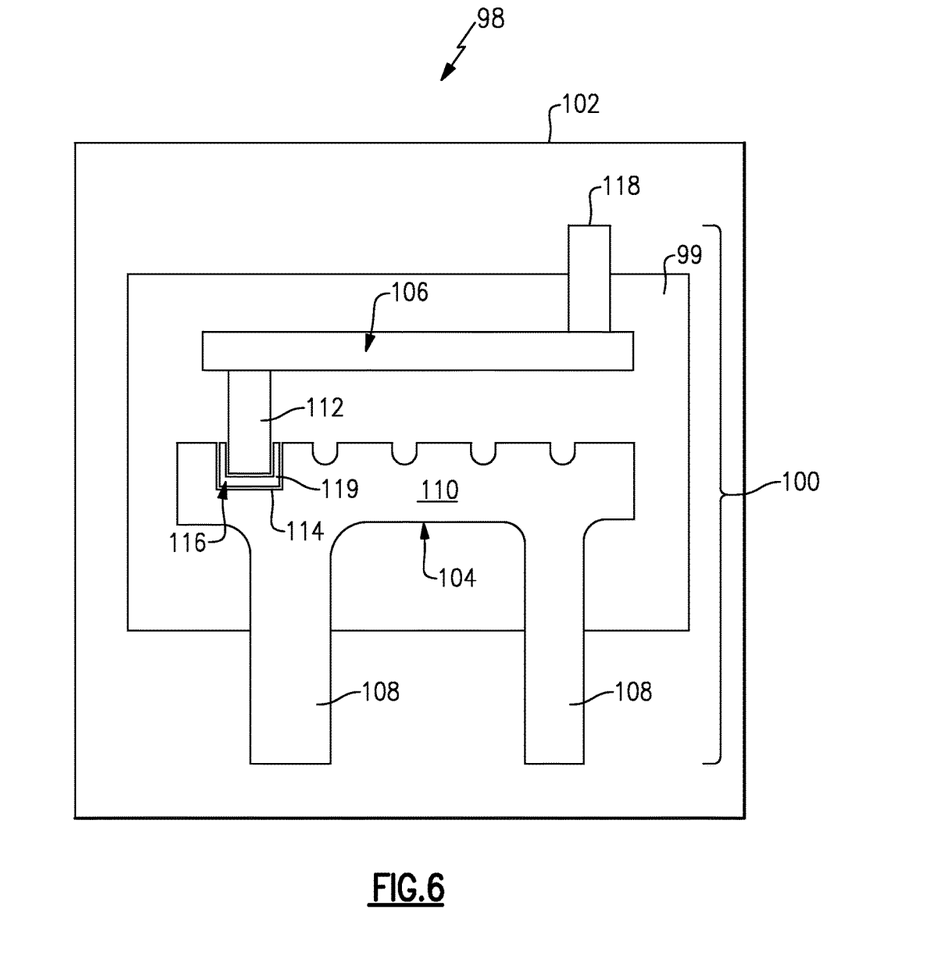
FIG. 6 illustrates a casting system that may be used to cast a platform cooling circuit inside a gas turbine engine component.

FIG. 6 schematically illustrates a casting system 98 that can be used to cast a gas turbine engine component that includes a cooling circuit, such as any of the cooling circuits described above and illustrated in FIGS. 2-5. The casting system 98 may include a core assembly 100 and a shell 102 that surrounds the core assembly 100.

As is known, molten material may be communicated into the casting system 98 to cast a component, such as the component 60 of FIG. 2 or any other component. The shell 102 and the core assembly 100 are removed once the molten material cools and solidifies. Removal of the core assembly 100 forms the internal cooling cavities of a particular cooling circuit.

In one embodiment, the core assembly 100 includes a feed core 104 and another core 106 that is separate from the feed core 104. The feed core 104 may be used to form the feed cavity 80 of the cooling circuit 78 of FIG. 3 and the core 106 may be used to form the cooling cavity 82 of the cooling circuit 78 of FIG. 3 (or other similar cavities), for example.

The feed core 104 may include one or more leg portions 108 and a main body portion 110 that extends transversely from the leg portions 108. In one embodiment, the leg portions 108 extend into the shell 102 and the main body portion 110 is spaced such that it does not extend into the shell 102.

One or more inlets 112 may plug into the feed core 104. The inlets 112 are received within a recess 114 of the main body portion 110 of the feed core 104. Ceramic glue or an adhesive 116 may fill a gap 119 between the inlet 112 and the recess 114 to assemble the core assembly 100. Plugging the inlets 112 into the feed core 104 allows for incorporation of multiple inlets in locations where they otherwise could not exist due to features, such as the rail 90, being in the way. This helps avoid core "tipping" during the casting procedure. In addition, the glue joint allows for small relative movements between the feed core 104 and the core 106, which reduces the potential for core breakage during the casting process.

In one embodiment, the core 106 is an optional feature of the core assembly 100. For example, the core 106 may be eliminated by extending the feed core 104 radially further into a casting area 99 (i.e., location where molten material is communicated) of the casting system 98. This can be achieved by providing the feed core 104 with relatively long leg portions 108 such that the positioning of the main body portion 110 can easily be adjusted during the casting development process.

The core assembly 100 may additionally include one or more exits 118. The exits 118 extend into the shell 102 and are constrained within the shell 102 to help hold the core assembly 100 in place.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A casting system, comprising:
    a core assembly configured to form a platform cooling circuit, said core assembly including a feed core that includes a leg portion and a main body portion that extends from said leg portion; and
    a shell that surrounds said core assembly, wherein said leg portion extends into said shell and said main body portion is spaced from said shell, wherein said leg portion is adjustable within said shell.

2. The casting system as recited in claim 1, wherein said core assembly includes a second core that is separate from said feed core.

3. The casting system as recited in claim 2, wherein said core assembly comprises an inlet that plugs into said feed core and an outlet that extends into said shell.

4. The casting system as recited in claim 3, wherein said inlet is received within a recess of said main body portion of said feed core.

5. The casting system as recited in claim 3, wherein said outlet extends from said second core to said shell.

6. The casting system as recited in claim 1, wherein said feed core includes a second leg portion extending into said shell.

7. A casting system, comprising:
    a core assembly configured to form a platform cooling circuit, said core assembly including a feed core that includes a lea portion and a main body portion that extends from said leg portion; and
    a shell that surrounds said core assembly, wherein said leg portion extends into said shell and said main body portion is spaced from said shell, wherein said feed core is adjustable by moving said feed core relative to said shell.

8. The casting system as recited in claim 7, said core assembly comprising
    an inlet that plugs into said feed core and an outlet that extends into said shell,
    a second core that is separate from said feed core, wherein said inlet extends from said second core and is received in a recess in said feed core.

9. The casting system as recited in claim 8, wherein ceramic glue or adhesive fills a gap between said inlet and said recess to allow for small relative movements between said feed core and said second core.

10. The casting system as recited in claim 8, wherein the second core includes a plurality of grooves for a plurality of heat augmentation devices.

11. A method of casting a gas turbine engine component, comprising:
    providing a shell having a casting area;
    providing a core assembly within said casting area, such that a leg portion of said core assembly extends into said shell, and a main body portion extending from said leg portion is within said casting area;
    communicating molten material into said casting area, and
    vertically adjusting said leg portion relative to said shell before said communicating.

12. The method as recited in claim 11, wherein said providing said core assembly includes:
    providing a second core separate from said main body portion;
    inserting an inlet extending from said second core into a recess of said main body portion; and
    providing an outlet that extends from said second core into said shell.

* * * * *

UNITED STATES PATENT AND TRADEMARK OFFICE
CERTIFICATE OF CORRECTION

PATENT NO. : 10,041,374 B2
APPLICATION NO. : 14/665182
DATED : August 7, 2018
INVENTOR(S) : Brandon W. Spangler, Ky H. Vu and Gina Cavallo It is certified that error appears in the above-identified patent and that said Letters Patent is hereby corrected as shown below:

In the Claims

In Claim 7, Column 8, Line 20; replace "includes a lea portion" with --includes a leg portion--

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*